United States Patent
Guo et al.

(10) Patent No.: US 7,609,889 B2
(45) Date of Patent: Oct. 27, 2009

(54) WEB SERVICE APPLICATION BASED OPTICAL CHARACTER RECOGNITION SYSTEM AND METHOD

(75) Inventors: Ruishan Guo, Beijing (CN); Yong Ni, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 545 days.

(21) Appl. No.: 11/098,422

(22) Filed: Apr. 5, 2005

(65) Prior Publication Data

US 2005/0226507 A1 Oct. 13, 2005

(30) Foreign Application Priority Data

Apr. 8, 2004 (CN) .................. 2004 1 0032522

(51) Int. Cl.
*G06K 9/18* (2006.01)
(52) U.S. Cl. ..................... 382/182; 382/317
(58) Field of Classification Search ............. 380/4, 380/182; 382/140, 169, 170, 182, 187, 195, 382/313, 321; 709/203, 217, 313; 715/200, 715/234, 249
See application file for complete search history.

(56) References Cited

U.S. PATENT DOCUMENTS

| 6,288,799 | B1 * | 9/2001 | Sekiguchi | ............ 358/468 |
| 6,415,064 | B1 * | 7/2002 | Oh | ............ 382/289 |
| 6,429,952 | B1 * | 8/2002 | Olbricht | ............ 358/442 |
| 6,480,304 | B1 * | 11/2002 | Os et al. | ............ 358/474 |
| 6,722,569 | B2 * | 4/2004 | Ehrhart et al. | ............ 235/469 |
| 6,834,807 | B2 * | 12/2004 | Ehrhart et al. | ............ 235/469 |

(Continued)

FOREIGN PATENT DOCUMENTS

WO          WO 01/49056 A1 *   7/2001

(Continued)

OTHER PUBLICATIONS

A.C Downton, A.C.Tams, G.J Wells, A.C Holmes and S.M Lucas, G.W Beccaloin, M.J. Schoble and G.S Robinson, "Constructing Web-Based Legacy Index—Architecture Design Issues and Initial Data Acquisition" IEEE 2000, pp. 854-858.*

(Continued)

*Primary Examiner*—Samir A. Ahmed
*Assistant Examiner*—Mekonen Bekele
(74) *Attorney, Agent, or Firm*—Fitzpatrick, Cella, Harper & Scinto (57) ABSTRACT

The present invention disclosed a web based OCR system including an OCR service apparatus that communicates with a web browser of a client apparatus and an optical character recognition method for controlling the OCR service apparatus that communicates with the web browser of the client apparatus, the OCR service apparatus comprising: a storage unit for storing an image; a sending unit for sending the image to the web browser of said client apparatus; a receiving unit for receiving a control instruction of a character recognition process from the web browser of said client apparatus, wherein the received control instruction is generated in the web browser of said client apparatus; and a character recognition processing unit for executing the character recognition process for the image based on the control instruction. With such optical character recognition method and system based on web service application on a network, the user can get control of the recognition process flow and the efficiencies are improved.

29 Claims, 4 Drawing Sheets

U.S. PATENT DOCUMENTS

| | | | |
|---|---|---|---|
| 6,901,166 B1* | 5/2005 | Nakayama | 382/182 |
| 6,930,792 B2* | 8/2005 | Cannon et al. | 358/1.15 |
| 7,130,466 B2* | 10/2006 | Seeber | 382/218 |
| 7,188,307 B2* | 3/2007 | Ohsawa | 715/205 |
| 7,392,935 B2* | 7/2008 | Byrne et al. | 235/379 |
| 2003/0046363 A1* | 3/2003 | Ezato | 709/218 |
| 2004/0205459 A1* | 10/2004 | Green | 715/500 |
| 2005/0144067 A1* | 6/2005 | Farahat et al. | 705/14 |
| 2005/0226507 A1* | 10/2005 | Guo et al. | 382/182 |
| 2005/0240756 A1* | 10/2005 | Mayer | 713/2 |
| 2006/0126110 A1* | 6/2006 | Ohara et al. | 358/1.15 |
| 2006/0173998 A1* | 8/2006 | Ohara | 709/224 |
| 2007/0025612 A1* | 2/2007 | Iwasaki et al. | 382/154 |
| 2007/0128899 A1* | 6/2007 | Mayer | 439/152 |
| 2007/0143398 A1* | 6/2007 | Graham | 709/204 |
| 2008/0052194 A1* | 2/2008 | Shinohara et al. | 705/27 |

FOREIGN PATENT DOCUMENTS

WO     WO 03/021997 A1 * 3/2003

OTHER PUBLICATIONS

Christian M. Strohmaier, Christoph Ringlstetter, Klaus U. Schulz "Lexical Post-correction of OCR-Results: The Web as a Dynamic Secondary?" Proceedings of the Seventh International Conference on Document Analysis and Recognition (ICDAR'03) IEEE 2003, pp. 1-5.*

H Goto, "A Platform for Web-Based OCR Systems with Server Search Function",www. weocr.ocrgrid.org/docs/das06.pdf—by H Goto—2006, pp. 1-4.*

* cited by examiner

WEB SERVICE APPLICATION BASED OPTICAL CHARACTER RECOGNITION SYSTEM AND METHOD

FIELD OF THE INVENTION

The present invention generally relates to web service application based optical character recognition (OCR) system. In particularly, the present invention relates to an optical character recognition method and an optical character recognition system based on web service application on a network, wherein the user can get control of the recognition process flow and the efficiencies are improved.

BACKGROUND OF THE INVENTION

OCR is a well-known technique in recognizing either hand-written characters or scanned characters. With the recently development of the network, including Internet and intranet, the remote OCR system that need not each user to have an individual OCR apparatus has been expanded fast and broadly.

However, most of the existing remote OCR systems are running in a very simple way, just consisting of uploading (the image file for OCR) and downloading (the recognition result). User can not get control of the recognition process flow. For example, user can not select the image areas to be recognized, user can not use the candidate characters generated in recognition for manual proof.

Besides the above mentioned OCR functions, the efficiencies of the OCR systems also should be considered. In the traditional way, data of the original image file must be transmitted along with other data received from OCR operations. Accordingly, the more operations it takes, the more frequent transmissions are required. Due to effects of the server's hardware limit and the network bandwidth, it will eventually cause the inefficiency of the whole system.

SUMMARY OF THE INVENTION

Accordingly, an object of the present invention is to solve the above mentioned problems by providing an optical character recognition method and an optical character recognition system based on web service application on a network, wherein the user can get control of the recognition process flow and the efficiencies are improved.

To achieve the above stated objects, according to one aspect of the present invention, there is provided an optical character recognition method based on web service application on a network, the method comprising the steps of a) uploading image file of an original image to a Web Server using a web browser; b) storing the uploaded image file; c) converting the uploaded image file and saving the converted image file by a Web Service Application; d) calling the Web Service Application through the Web Server by an ImageApplet to recognize a selected image area for recognition; and e) returning the recognition information data of the selected image area for recognition.

To achieve the above stated objects, according to another aspect of the present invention, there is provided an optical character recognition system based on web service application on a network, the system comprising a web browser for uploading image file of an original image; a Web Server; a Web Service Application unit for converting the uploaded image file and saving the converted image file; and an ImageApplet unit for calling the Web Service Application unit through the Web Server to recognize a selected image area for recognition.

To achieve the above stated objects, according to another aspect of the present invention, there is provided an optical character recognition method for controlling an OCR service providing apparatus, the method comprising the steps of receiving an image file of an original image; storing the received image file; converting the image file and saving the converted image file; sending the converted image file to an OCR result receiving apparatus for a control of a character recognition process; receiving a control instruction of the character recognition process for the converted image file from the OCR result receiving apparatus; executing the character recognition process for the original image based on the received instruction; and sending a result of the executed character recognition process to the OCR result receiving apparatus.

To achieve the above stated objects, according to another aspect of the present invention, there is provided an OCR service providing apparatus comprising an image processing unit for receiving and converting an original image to be recognized, and sending the converted image file to an OCR receiving apparatus; and an OCR recognition unit for receiving a control instruction of a character recognition process for the converted image file and executing the character recognition process. The image processing unit comprises an input means for receiving an image file of the original image; a memory means for storing the received image file; a convert means for converting the image file and saving the converted image file; and an image output means for sending the converted image file to the OCR result receiving apparatus for a control of a character recognition process. The OCR recognition unit comprises an instruction receipt means for receiving the control instruction of the character recognition process for the converted image file from the OCR result receiving apparatus; a recognition means for executing the character recognition process for the original image based on the received instruction; and a recognition result output means for sending a result of the executed character recognition process to the OCR result receiving apparatus.

To achieve the above stated objects, according to another aspect of the present invention, there is provided an optical character recognition method for controlling an OCR result receiving apparatus, the method comprising the steps of receiving a converted image file from an OCR service providing apparatus, the converted image file being generated by converting an original image file of an original image at the OCR service providing apparatus; sending a control instruction of the character recognition process for the received converted image file based on an user's instructions; and receiving a result of a character recognition process for the original image from the OCR service providing apparatus, the character recognition process being executed based on the sent control instruction by the OCR service providing apparatus.

To achieve the above stated objects, according to another aspect of the present invention, there is provided an OCR result receiving apparatus comprising an image receipt unit for receiving a converted image file from an OCR service providing apparatus, the converted image file being generated by converting an original image file of an original image at the OCR service providing apparatus; an instruction transmission unit for sending a control instruction of the character recognition process for the received converted image file based on an user's instructions; and a recognition result receipt unit for receiving a result of a character recognition process for the original image from the OCR service providing apparatus, the character recognition process being executed based on the sent control instruction by the OCR service providing apparatus.

With such optical character recognition method and system based on web service application on a network according to the present invention, the user can get control of the recognition process flow and the efficiencies of the OCR are improved.

BRIEF DESCRIPTION OF THE DRAWINGS

Other objects, features and advantages of the present invention will become more apparent after reading the following detailed description of the preferred embodiments. The accompanying drawings, which are incorporated in and constitute a part of the specification, illustrate the embodiments of the present invention and, together with the description, serve to explain the principles of the present invention. In the drawings.

DETAILED DESCRIPTION OF THE PREFERRED EMBODIMENTS

The preferred embodiments of the present invention will now be described with reference to the accompanying drawings.

Figure 1:
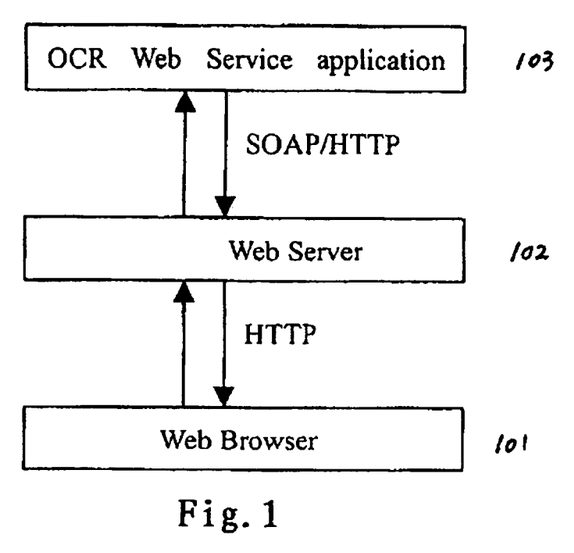
FIG. 1 is the basic system architecture for realizing the optical character recognition method according to the present invention.

As shown in FIG. 1, the optical character recognition (OCR) system according to the present invention is based on B/S architecture. The B/S architecture is the process to segment an input image into a plurality of areas in accordance with the object attribute of text, table, line, picture and so on and to select an area subject to an OCR process. The OCR functions are completed on the server side by the Web Server 102 and OCR web service application 103 and user uses a web browser 101 to do OCR operations.

User uses a web browser 101 for OCR process. User can watch the image in the web browser, do image rotation, do image color reversion, and do image area selection manually or automatically, and do recognition for selected image area.

The OCR system according to the present invention separates the OCR functions and user interface to two parts. OCR functions are implemented by web service application. Its public interface can be called by other systems. User interface is implemented by web pages. Two Java applets are used in the main user interface. These two applets implement most of the manual operations. One applet (ImageApplet) is for image display and process, the other applet (ProofApplet) is for proof. These two applets communicate with the Web Server, which in turn call the OCR web service application for OCR process.

Besides the OCR functions, in order to improve the efficiencies of the OCR system instead of transmitting the data of the image file along with other data received from OCR operations in the traditional way, three key process methods are used to reduce the data transmissions on the network to the minimum.

Firstly, during the OCR operations, the image uploaded to the server should be shown on the client for convenience. The image data saved on the server will be converted to GIF file format, and returned to the client for exhibition, as a substitute of the original image file. When an image file data is converted to GIF format from other image format, its file size could be reduced to a quarter of the original file format (usually the TIFF, BMP, JPG, etc.), or much less.

Secondly, for some image processes, such as rotation and reversion, the ImageApplet is used to do the job and the OCR Web Service Application is left alone. Thus, the transmission of image data could be avoided. And only a little operation information should be recorded for further use.

Thirdly, as to the block selection and block recognition, the data transmission is simplified by only passing data retrieved from the block selection or block recognition, and using the pre-transmitted GIF image as a "substitute" of the original image file on the client. And no network transmission is committed for the original image data.

Figure 2:
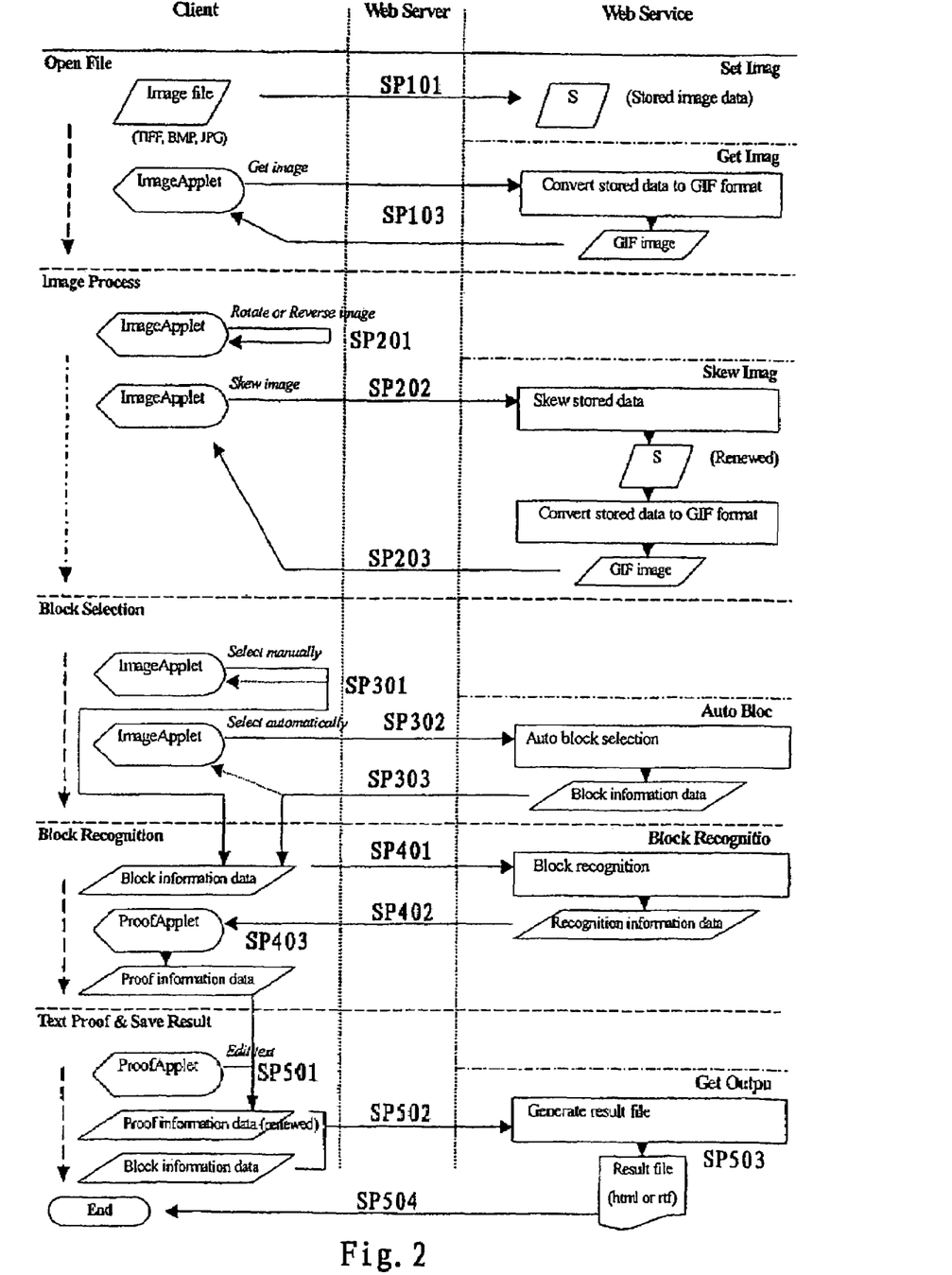
FIG. 2 is a flow chart of the optical character recognition method based on web service application on a network according to the present invention.

The detailed processing procedure of the optical character recognition method based on web service application on a network according to the present invention will be described and the complete process flow chart of the method is illustrated in FIG. 2.

As show in FIG. 2, the processing steps are divided into 5 stages based on the event performed in the recognition procedure. That is, opening file, image processing, block selection, block recognition, text proof and saving result. Now, each of the 5 stages will be described in detail with reference to FIG. 2.

1. Opening File

Firstly, in step SP101, the user uploads image file to the Web Server using web browser, the Web Server calls the OCR Web Service Application unit and sends the image file to the OCR Web Service Application unit at the same time, and the OCR Web Service Application unit saves the image file.

Then in step SP102, the OCR Web Service Application unit converts the uploaded image file into a file in GIF format.

After that, the ImageApplet unit calls the Web Service Application unit through the Web Server to get a black and white (B/W) image copy of the original image in GIF format.

2. Image Processing

After opening the file and getting the image file in GIF format by the ImageApplet unit, the image processing is began.

In step SP201, the user can use the ImageApplet unit to do some image processes, such as image rotation and image color reversion etc. After such image processes, the parameters on the related image processes are transmitted to the OCR Web Service Application unit through the Web Server.

Then, in step SP202, if the skew correction is required, the OCR Web Service Application unit is called to implement the auto skew correction to its saved image data. In such a case, what transmitted to the OCR Web Service Application unit by the ImageApplet unit are instructions on how to correct the skew image or parameters on the skew image.

The ImageApplet unit also can send the edition information on the image area to be recognized, such as the image to be recognized is written in Chinese or English, the image to be recognized is a table edited with an Excel program, etc., to the OCR Web Service Application unit through the Web Server.

After that, in step SP203, one B/W image copy in GIF format of the renewed image will be returned to the ImageApplet unit for display.

3. Block Selection

After the image processing is finished and the renewed image in GIF format has been displayed in the ImageApplet unit, the user can select the image area to be recognized by the Web Service Application unit.

Using the ImageApplet unit, user can do image area selection manually as shown in step SP301 of FIG. 2, or do automatic selection as shown in step SP302.

If the image area for recognition is automatic selected in step SP302, the OCR Web Service Application unit returns the block information data to the ImageApplet unit in step SP303.

4. Block Recognition

After the image area for recognition is determined in the above process, in step SP401, the user can use the ImageApplet unit to call the OCR Web Service Application unit through the Web Server to do recognition for the selected image area.

In step SP402, the OCR Web Service Application unit returns the recognition information data to the ProofApplet unit. It should be noted that what returned to the ProofApplet are the recognition information data of the image area for to be recognized instead of the recognized image itself.

After that, the data returned are parsed and texts are displayed on the ProofApplet unit in step SP403.

5. Text Proof and Save Result

After the parsed texts are displayed on the ProofApplet unit, the user can do proof with the ProofApplet unit in step SP501. Candidate can be selected to replace the old character.

Then, in step SP502, the user calls the Web Service Application unit with the ProofApplet unit through the Web Server to generate a result file. In step SP503, the Web Service Application unit saves the result file to a formatted file (HTML or RTF).

Finally, in step SP504, the formatted file in HTML format or RTF format is sent back and the process flow is completed.

Figure 3:
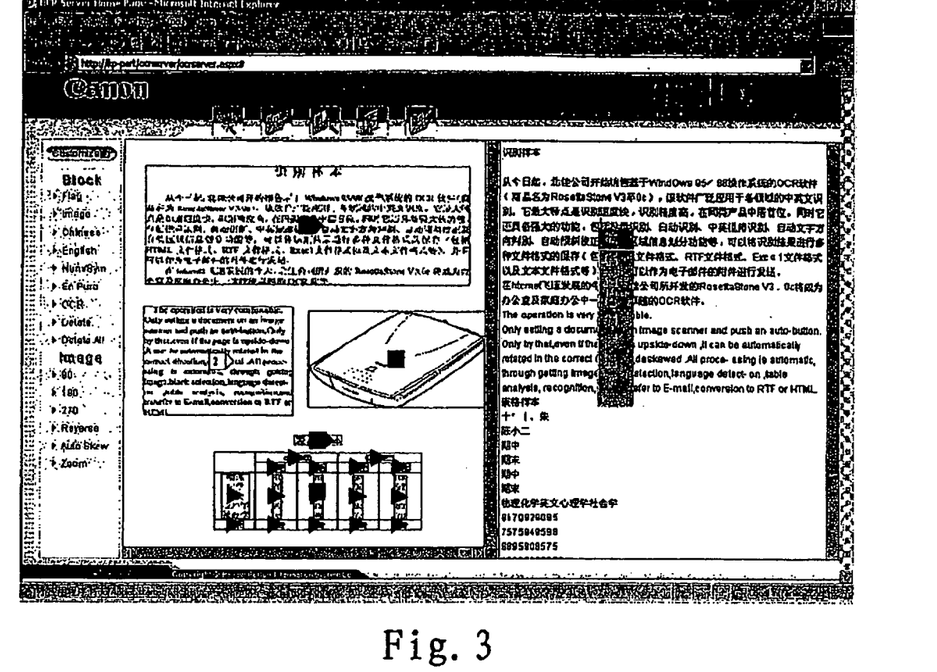
FIG. 3 shows the web page of the implementation sample according to the optical character recognition method of the present invention.
Figure 4:
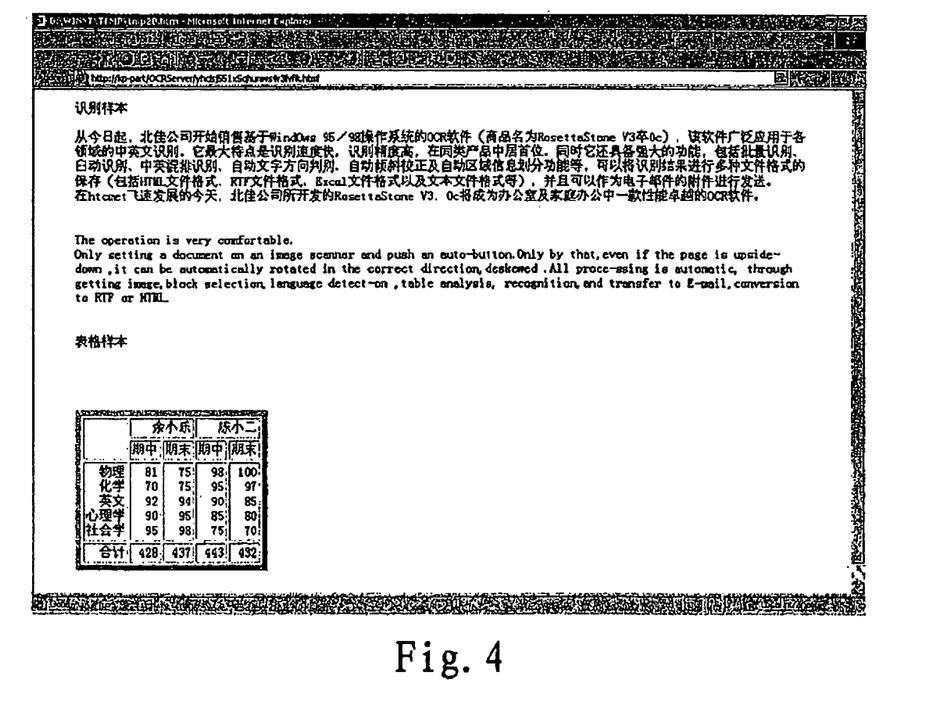
FIG. 4 shows the recognition result of the web page shown in FIG. 3 using the optical character recognition method of the present invention.

An example of the recognition result is illustrated in FIG. 3 and FIG. 4.

FIG. 3 shows the web page of the implementation sample according to the optical character recognition method of the present invention. As shown in FIG. 3, the processes performed by the ImageApplet are displayed on the left. The images to be recognized are shown in the middle of the screen, in which on the top shows an image whose contents are written in Chinese, in the middle show an image whose contents are written in English and a picture image that need not to recognize, and in the bottom shows an image whose contents are edited with an Excel program. The recognition results on the above indicated images are displayed on the right of the screen.

FIG. 4 shows the finally recognition result of the web page shown in FIG. 3 using the optical character recognition method of the present invention. As shown in FIG. 4, the recognition results are shown in HTML format or RTF format and the errors existing in the recognition data shown in FIG. 3 have been proofed by the user with the ProofApplet unit.

The above described optical character recognition method is realized in an optical character recognition system based on web service application on a network according to the present invention. Such an optical character recognition system is shown in FIG. 5.

Figure 5:
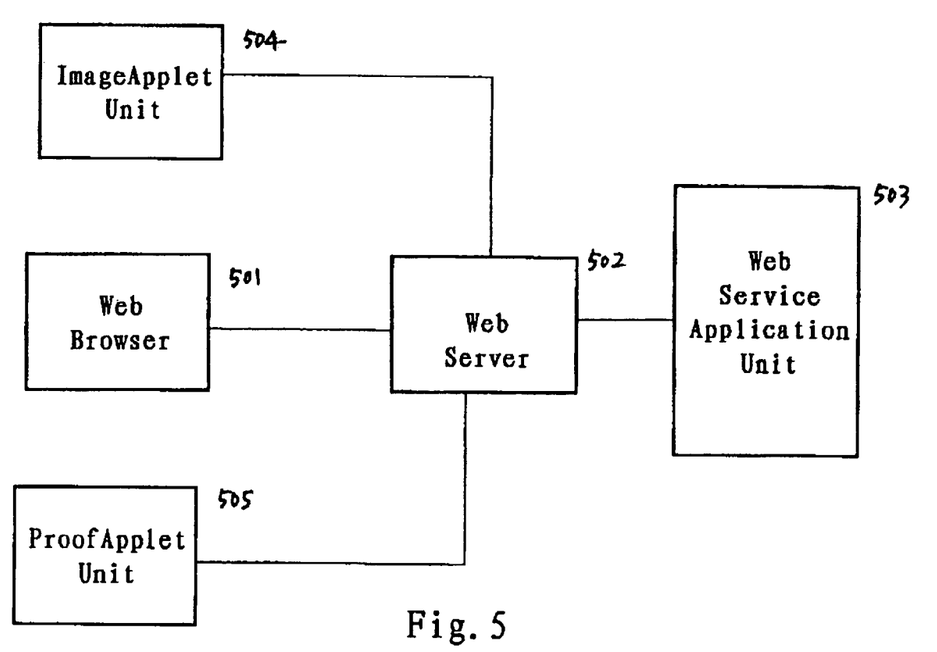
FIG. 5 is the block diagram of the optical character recognition system based on web service application on a network according to the present invention.

As shown in FIG. 5, the optical character recognition system based on web service application on a network according to the present invention comprises a web browser 501 for uploading image file of an original image; a Web Server 502; a Web Service Application unit 503 for converting the uploaded image file and saving the converted image file; an ImageApplet unit 504 for calling the Web Service Application unit through the Web Server to recognize a selected image area for recognition; and a ProofApplet unit 505 for receiving the recognition information data of the selected image area for recognition.

The Web Service Application unit 503 converts the uploaded image file into a file in GIF format, and the ImageApplet unit 504 calls the Web Service Application unit through the Web Server to obtain a B/W image copy of the original image in GIF format.

The selected image area for recognition is manually or automatic selected by using the ImageApplet unit 504 and the Web Service Application unit 505 returns the block information data of the selected image area for recognition to the ImageApplet unit 504.

The ImageApplet unit 504 processes the obtained B/W image copy of the original image in GIF format before the image area for recognition is selected. The process performed by the ImageApplet unit 504 includes image rotation and image color reversion.

If the skew correction is required, the Web Service Application unit 505 is called to implement the auto skew to its saved image data, then one B/W image copy in GIF format of the renewed image is returned to the ImageApplet unit 504 for display.

The received recognition information data of the selected image area for recognition are parsed and text displayed on the ProofApplet unit 505. The old unsuitable characters are replaced with their suitable candidate characters by the ProofApplet unit 505.

The ProoApplet unit 505 calls the Web Service Application unit 503 through the Web Server to save the recognition data being replaced the old unsuitable characters with their suitable candidate characters to a formatted file. The formatted file is a file in HTML format or a file in RTF format.

Figure 6:
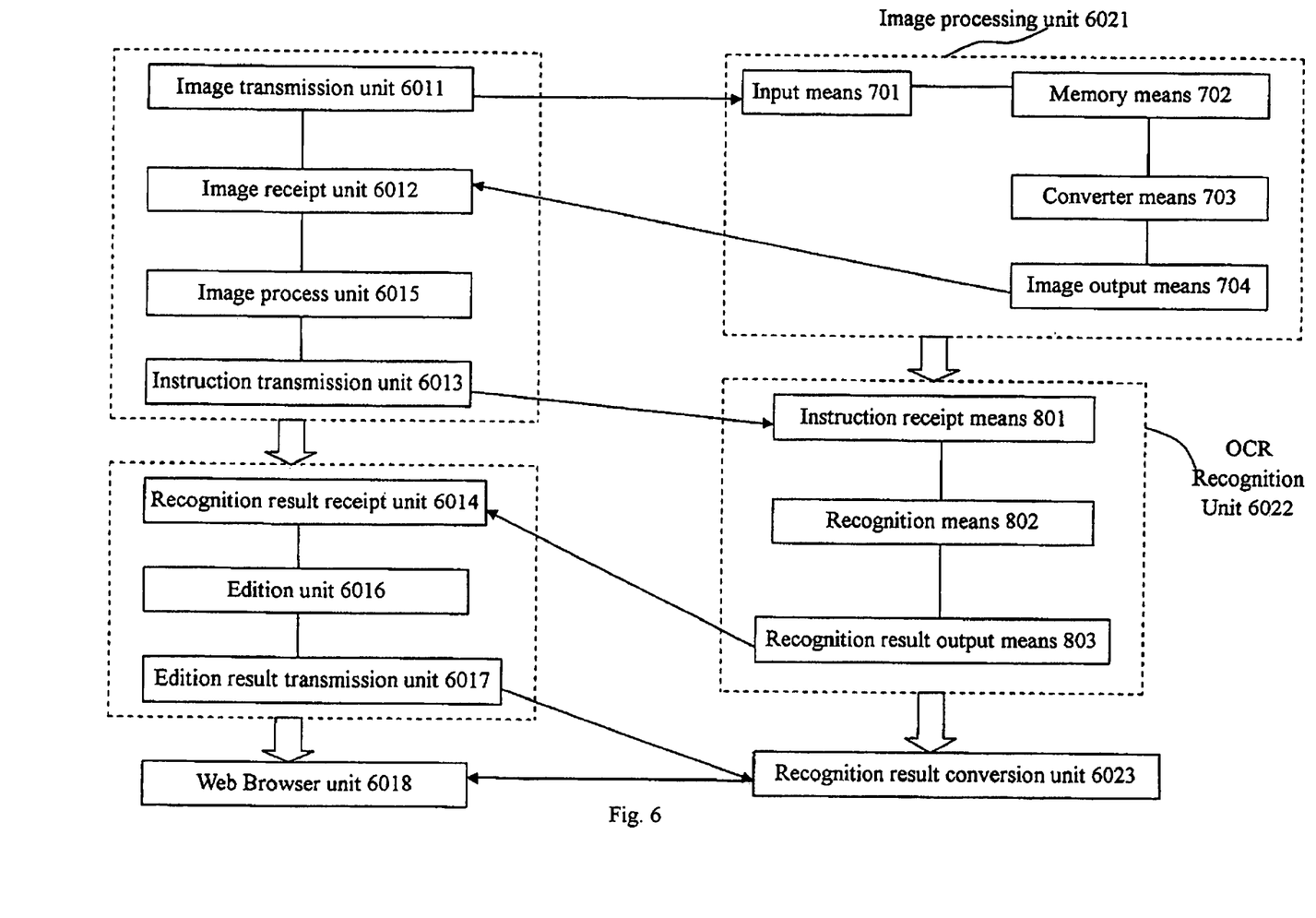
FIG. 6 shows the detailed structures of the respective server side (OCR service providing apparatus 601) and the client side (OCR result receiving apparatus 602) according to the present invention.

As mentioned in the above description, the optical character recognition system according to the present invention is based on B/S architecture. That is, the OCR functions are completed on the server side and the OCR operations are processed by the user on the client side. FIG. 6 shows the detailed structures of the respective server side (OCR service providing apparatus 601) and the client side (OCR result receiving apparatus 602).

As shown in FIG. 6, the OCR service providing apparatus 602 comprises an image processing unit 6021 for receiving and converting an original image to be recognized, and sending the converted image file to an OCR receiving apparatus; and an OCR recognition unit 6022 for receiving a control instruction of a character recognition process for the converted image file and executing the character recognition process.

The image processing unit 6021 comprises an input means 701 for receiving an image file of the original image; a memory means 702 for storing the received image file; a convert means 703 for converting the image file and saving the converted image file; and an image output means 704 for sending the converted image file to the OCR result receiving apparatus for a control of a character recognition process.

The OCR recognition unit 6022 comprises an instruction receipt means 801 for receiving the control instruction of the character recognition process for the converted image file from the OCR result receiving apparatus; a recognition means 802 for executing the character recognition process for the original image based on the received instruction; and a recognition result output means 803 for sending a result of the executed character recognition process to the OCR result receiving apparatus.

In an embodiment of the OCR service providing apparatus according to present invention, the received image file is converted into a file in GIF format and a B/W image copy of the original image in GIF format is sent to the OCR result receiving apparatus. Accordingly, the image area to be recognized is manually or automatic selected on the OCR result receiving apparatus based on the B/W image copy of the original image in GIF format and the OCR service providing apparatus receives the block information data of the selected image area for recognition.

Preferably, the B/W image copy of the original image in GIF format is processed and edited by the OCR result receiving apparatus and the OCR service providing apparatus receives the parameters on the image processes and the edition information of the selected image area for recognition.

If a skew correction is required, the OCR service providing apparatus implements the auto skew to its saved image data and sending one B/W image copy in GIF format of the renewed image to the OCR result receiving apparatus. The OCR service providing apparatus further receives instructions on how to correct the skew image or parameters on the skew image from the OCR result receiving apparatus.

In another embodiment of the OCR service providing apparatus according to the present invention, it further comprises recognition result conversion unit 6023 for receiving a suitable candidate character for the corresponding old unsuitable character from the OCR result receiving apparatus. The recognition result conversion unit 6023 converts the recognition data being replaced the corresponding old unsuitable character with the suitable candidate character to a formatted file.

The formatted file is preferably a file in HTML format or a file in RTF format.

Next, the OCR result receiving apparatus 601 on the client side according to the present invention will be described in connection with the left part of FIG. 6.

As shown in figure, the OCR result receiving apparatus 601 comprises an image transmission unit 6011 for sending the original image file of the original file to the OCR service providing apparatus; an image receipt unit 6012 for receiving a converted image file from an OCR service providing apparatus, the converted image file being generated by converting an original image file of an original image at the OCR service providing apparatus; an instruction transmission unit 6013 for sending a control instruction of the character recognition process for the received converted image file based on an user's instructions; and a recognition result receipt unit 6014 for receiving a result of a character recognition process for the original image from the OCR service providing apparatus, the character recognition process being executed based on the sent control instruction by the OCR service providing apparatus.

In an embodiment of the OCR result receiving apparatus 601 according to the present invention, the converted image file is a file in GIF format and a B/W image copy of the original image is received from the OCR service providing apparatus 602.

In another embodiment of the OCR result receiving apparatus 601 according to the present invention, the OCR result receiving apparatus 601 further comprises an image process unit 6015 for selecting an image area for recognition of the original image, and the instruction transmission unit 6013 returns the block information data of the selected image area for recognition to the OCR service providing apparatus.

Preferably, before selecting the image area for recognition, the obtained B/W image copy of the original image in GIF format is processed by the image process unit 6015 in advance. Such process includes image rotation and image color reversion. After the process performed by the image process unit 6015 is completed, the instruction transmission unit 6013 sends the parameters on the image processes and the edition information of the selected image area for recognition to the OCR service providing apparatus.

In addition, the instruction transmission unit 6013 further sends instructions on how to correct a skew image or parameters on the skew image to the OCR service providing apparatus if the skew correction is required.

In a preferred embodiment of the present invention, the OCR result receiving apparatus 601 further comprises an edition unit 6016 for parsing the returned recognition information data of the selected image area for recognition and the parsed texts are displayed on a Web Browser unit 6018. The old unsuitable characters are replaced with their suitable candidate characters by the edition unit 6016. After the edition performed by the edition unit 6016 is completed, the edition result is sent to the OCR service providing apparatus 602 by an edition result transmission unit 6017.

The structures of the OCR service providing apparatus 602 on the server side and the OCR result receiving apparatus 601 on the client side are described in the above description in connection with the accompanying FIG. 6. Accordingly, an optical character recognition method for controlling the OCR service providing apparatus 602 and an optical character recognition method for controlling the OCR result receiving apparatus 601 according to the present invention can be implemented in the server side and the client side respectively.

Next, the optical character recognition method for controlling the OCR service providing apparatus 602 and the optical character recognition method for controlling the OCR result receiving apparatus 601 according to the present invention will be described in connection with the accompanying FIG. 6 respectively.

The optical character recognition method for controlling the OCR service providing apparatus 602 according to the present invention comprises the steps of receiving an image file of an original image by the input means 701; storing the received image file by the memory means 702; converting the image file and saving the converted image file by the convert means 703; sending the converted image file to an OCR result receiving apparatus for a control of a character recognition process by the image output means 704; receiving a control instruction of the character recognition process for the converted image file from the OCR result receiving apparatus by the instruction receipt means 801; executing the character recognition process for the original image based on the received instruction by the recognition means 802; and sending a result of the executed character recognition process to the OCR result receiving apparatus by the recognition result output means 803.

In an embodiment of the present invention, the received image file is converted into a file in GIF format and a B/W image copy of the original image in GIF format is sent to the OCR result receiving apparatus 601. The image area to be recognized is manually or automatic selected on the OCR result receiving apparatus 601 based on the B/W image copy of the original image in GIF format and the OCR service providing apparatus 602 receives the block information data of the selected image area for recognition.

In a preferred embodiment of the present invention, the B/W image copy of the original image in GIF format is processed and edited by the OCR result receiving apparatus 601 and the OCR service providing apparatus 602 receives the parameters on the image processes and the edition information of the selected image area for recognition.

If a skew correction is required, the OCR service providing apparatus 602 implements the auto skew to its saved image data and sending one B/W image copy in GIF format of the renewed image to the OCR result receiving apparatus 601. Then, the OCR service providing apparatus 602 receives instructions on how to correct the skew image or parameters on the skew image from the OCR result receiving apparatus 601.

In another embodiment of the present invention, the OCR service providing apparatus 602 further receives a suitable candidate character for the corresponding old unsuitable character from the OCR result receiving apparatus 601 and converts the recognition data being replaced the corresponding old unsuitable character with the suitable candidate character to a formatted file. The formatted file is preferably a file in HTML format or a file in RTF format.

Now, the optical character recognition method for controlling an OCR result receiving apparatus 601 will be described in detail by referring to the accompanying FIG. 6.

The optical character recognition method for controlling an OCR result receiving apparatus 601 comprises the steps of receiving a converted image file from an OCR service providing apparatus 602 by the image receipt unit 6012, the converted image file being generated by converting an original image file of an original image at the OCR service providing apparatus 602; sending a control instruction of the character recognition process for the received converted image file based on an user's instructions by the instruction transmission unit 6013; and receiving a result of a character recognition process for the original image from the OCR service providing apparatus 602 by the recognition result receipt unit 6014, the character recognition process being executed based on the sent control instruction by the OCR service providing apparatus.

In an embodiment of the present invention, the original image file of the original file is sent to the OCR service providing apparatus 602 by the image transmission unit 6011 of the OCR result receiving apparatus 601 or is downloaded from a network, such as Internet and Intranet.

Preferably, the converted image file is a file in GIF format and a B/W image copy of the original image is received from the OCR service providing apparatus 602.

In another embodiment of the optical character recognition method for controlling the OCR result receiving apparatus 601 according to the present invention further comprises the steps of manually or automatic selecting an image area for recognition of the original image and returning the block information data of the selected image area for recognition to the OCR service providing apparatus 602 by the image process unit 6015.

Preferably, before selecting the image area for recognition, the obtained B/W image copy of the original image in GIF format is processed in advance. Such process includes image rotation and image color reversion. Then, the parameters on the image processes and the edition information of the selected image area for recognition are sent to the OCR service providing apparatus 602.

If a skew correction is required, the optical character recognition method for controlling the OCR result receiving apparatus 601 according to the present invention further comprises a step of sending instructions on how to correct a skew image or parameters on the skew image to the OCR service providing apparatus.

In a preferred embodiment of the present invention, the returned recognition information data of the selected image area for recognition are parsed and the parsed texts are displayed. The old unsuitable characters are replaced by their suitable candidate characters. After that, the information on replaced characters is sent to the OCR service providing apparatus 602.

It is also important to note that the present invention includes a case wherein the invention is achieved by directly or remotely supplying a program (a program corresponding to the illustrated flow chart in the embodiment) of software that implements the functions of the aforementioned embodiments to a system or apparatus, and reading out and executing the supplied program code by a computer of that system or apparatus. In such case, the form is not limited to a program as long as the program function can be provided.

Therefore, the program code itself installed in a computer to implement the functional process of the present invention using computer implements the present invention. That is, the present invention includes the computer program itself for implementing the functional process of the present invention.

In this case, the form of program is not particularly limited, and an object code, a program to be executed by an interpreter, script data to be supplied to an OS, and the like may be used as along as they have the program function.

As a recording medium for supplying the program, for example, a floppy disk, hard disk, optical disk, magneto optical disk, MO, CD-ROM, CD-R, CD-RW, magnetic tape, non-volatile memory card, ROM, DVD (DVD-ROM, DVD-R), and the like may be used.

As another program supply method, connection may be established to a given home page on the Internet using a browser on a client computer, and the computer program itself of the present invention or a file, which is compressed and includes an automatic installation function, may be downloaded from that home page to a recording medium such as a hard disk or the like, thus supplying the program. Also, program codes that form the program of the present invention may be broken up into a plurality of files, and these files may be downloaded from different home pages. That is, the present invention also includes a WNW server that makes a plurality of users download program files for implementing the functional process of the present invention using a computer.

Also, a storage medium such as a CD-ROM or the like, which stores the encrypted program of the present invention, may be delivered to the user, the user who has cleared a predetermined condition may be allowed to download key information that decrypts the program from a home page via the Internet, and the encrypted program may be executed using that key information to be installed on a computer, thus implementing the present invention.

The functions of the aforementioned embodiments may be implemented not only by executing the readout program code by the computer but also by some or all of actual processing operations executed by an OS or the like running on the computer on the basis of an instruction of that program.

Furthermore, the functions of the aforementioned embodiments may be implemented by some or all of actual processes executed by a CPU or the like arranged in a function extension board or a function extension unit, which is inserted in or connected to the computer, after the program read out from the recording medium is written in a memory of the extension board or unit.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A web based OCR system including an OCR service apparatus that communicates with a web browser of a client apparatus, the OCR service apparatus comprising:
    a storage storing an original image;
    a converter unit for converting the original image into a converted image of a predetermined format for a transmission;
    a sending unit for sending the converted image to the web browser of said client apparatus;
    a receiving unit for receiving a control instruction of a character recognition process sent from the web browser of said client apparatus after an image processing has been executed for the converted image in the web browser of said client apparatus, wherein the received control instruction includes a parameter of the image processing which has been executed for the converted image in the web browser of said client apparatus; and
    a character recognition processing unit for executing the image processing for the stored original image based on the parameter included in the control instruction and executing the character recognition process for the original image for which the image processing has been executed.

2. The web based OCR system according to claim 1, wherein the control instruction of the character recognition process is generated by a Java applet in the web browser of said client apparatus.

3. The web based OCR system according to claim 2, wherein the Java applet in the web browser of said client apparatus executes processes of:
    receiving the converted image sent from said sending unit;
    executing the image processing for the converted image; and
    sending the control instruction which includes the parameter of the image processing which has been executed for the converted image by the Java applet.

4. The web based OCR system according to claim 1, wherein the OCR service apparatus further comprises image receiving unit for receiving the original image uploaded from the web browser of said client apparatus, the received original image being stored by said storage unit.

5. The web based OCR system according to claim 1, wherein the predetermined format of the image converted by said converter unit is GIF format.

6. The web based OCR system according to claim 1, said web based OCR system further including a web server, wherein said OCR service apparatus communicates with the web browser of said client apparatus via said web server.

7. The web based OCR system according to claim 1, wherein the control instruction includes information for selecting an area for the character recognition process.

8. The web based OCR system according to claim 7, wherein the area for the character recognition process is manually or automatic selected.

9. The web based OCR system according to claim 7, wherein the area for the character recognition process is displayed in the web browser of said client apparatus.

10. The web based OCR system according to claim 1, wherein the control instruction includes information for a skew correction of the image.

11. The web based OCR system according to claim 1, wherein the control instruction includes at least one of image rotation and image color reversion.

12. The web based OCR system according to claim 1, wherein the web browser of said client apparatus displays the result of the character recognition process executed by said character recognition processing unit.

13. The web based OCR system according to claim 1, said OCR service apparatus further comprising a result file generating unit for generating a result file based on suitable candidate characters with which old unsuitable characters of the character recognition result have been replaced by a Java applet of the web browser of said client apparatus.

14. The web based OCR system according to claim 1, wherein the converted image of the predetermined format is a black and white image.

15. An optical character recognition method for controlling an OCR service apparatus that communicates with a web browser of a client apparatus, the method comprising the steps of:
    storing an original image;
    converting the original image into a converted image of a predetermined format;
    sending the converted image to the web browser of said client apparatus;
    receiving a control instruction of a character recognition process sent from the web browser of said client apparatus after an image processing has been executed for the converted image in the web browser of said client apparatus, wherein the received control instruction includes a parameter of an image processing which has been executed for the converted image in the web browser of said client apparatus; and
    executing the image processing for the stored original image based on the parameter included in the control instruction and executing the character recognition process for the original image for which the image processing has been executed.

16. The optical character recognition method according to claim 15, wherein the control instruction of the character recognition process is generated by a Java applet in the web browser of said client apparatus.

17. The optical character recognition method according to claim 16, wherein the Java applet in the web browser of said client apparatus executes processes of:
    receiving the converted image sent from said OCR service apparatus;
    executing the image processing for the converted image; and
    sending the control instruction which includes the parameter of the image processing which has been executed for the converted image by the Java applet.

18. The optical character recognition method according to claim 15, further comprising the step of receiving the original image uploaded from the web browser of said client apparatus, the received original image being stored in said storing step.

19. The optical character recognition method according to claim 15, wherein the predetermined format of the image converted by said converter unit is GTE format.

20. The optical character recognition method according to claim 15, wherein said OCR service apparatus communicates with the web browser of said client apparatus via a web server.

21. The optical character recognition method according to claim 15, wherein the control instruction includes information for selecting an area for the character recognition process.

22. The optical character recognition method according to claim 21, wherein the area for the character recognition process is manually or automatically selected.

23. The optical character recognition method according to claim 21, wherein the area for the character recognition process is displayed on the web browser of said client apparatus.

24. The optical character recognition method according to claim 15, wherein the control instruction includes information for a skew correction of the image.

25. The optical character recognition method according to claim 16, wherein the control instruction includes at least one of image rotation and image color reversion.

26. The optical character recognition method according to claim 15, wherein the web browser of said client apparatus displays the result of the character recognition process.

27. The optical character recognition method according to claim 15, further comprising the step of generating a result file based on suitable candidate characters with which old unsuitable characters of the character recognition result have been replaced by a Java applet of the web browser of said client apparatus.

28. A computer-executable program, when executed by a computer, enables the computer to execute the steps according to claim 15.

29. A computer-readable storage medium storing program code of the computer-executable program according to claim 28.

* * * * *